(12) United States Patent
Gurney et al.

(10) Patent No.: US 8,724,744 B2
(45) Date of Patent: May 13, 2014

(54) METHOD AND APPARATUS FOR WIDE DYNAMIC RANGE REDUCTION

(75) Inventors: David P. Gurney, Carpentersville, IL (US); Anthony R. Schooler, Bartlett, IL (US)

(73) Assignee: General Instrument Corporation, Horsham, PA (US)

( * ) Notice: Subject to any disclaimer, the term of this patent is extended or adjusted under 35 U.S.C. 154(b) by 948 days.

(21) Appl. No.: 11/207,843

(22) Filed: Aug. 19, 2005

(65) Prior Publication Data

US 2007/0041474 A1    Feb. 22, 2007

(51) Int. Cl.
    *H04L 27/22*    (2006.01)

(52) U.S. Cl.
    USPC ........... 375/332; 375/279; 375/280; 375/281; 375/322; 375/324; 375/329; 375/330; 375/331; 375/346; 375/350; 375/351

(58) Field of Classification Search
    USPC ......... 375/316, 329, 332, 340, 279, 324, 328, 375/331, 346, 349, 350, 351, 280, 281, 283, 375/322, 330, 342
    See application file for complete search history.

(56) References Cited

U.S. PATENT DOCUMENTS

| | | | | |
|---|---|---|---|---|
| 4,631,738 A | * | 12/1986 | Betts et al. | 375/345 |
| 5,457,710 A | * | 10/1995 | Miyo et al. | 375/340 |
| 5,844,943 A | * | 12/1998 | Kazecki et al. | 375/261 |
| 6,009,317 A | * | 12/1999 | Wynn | 455/296 |
| 6,226,333 B1 | * | 5/2001 | Spalink | 375/340 |
| 6,778,614 B1 | * | 8/2004 | Myers | 375/332 |
| 6,785,343 B1 | * | 8/2004 | Hsu | 375/316 |
| 7,110,477 B2 | * | 9/2006 | Suissa et al. | 375/334 |
| 7,242,729 B1 | * | 7/2007 | Heistermann et al. | 375/329 |
| 7,750,976 B2 | * | 7/2010 | Scott et al. | 348/558 |
| 2002/0065861 A1 | * | 5/2002 | Kim et al. | 708/270 |

FOREIGN PATENT DOCUMENTS

EP    0896458 B1    4/2003

OTHER PUBLICATIONS

Extended European Search Report for Application No. 06254055.4-1525, dated Dec. 1, 2006.
Mexican Office Action for MX PA/a/2006/009477, dated Nov. 21, 2008.
Office Action mailed on Sep. 19, 2007 in European Patent Application No. EP 06254055.4.
Office Action mailed on Jun. 16, 2009 in Mexican Patent Application No. MX PA/a/2006/009477 (English Translation).
Office Action mailed on Sep. 8, 2011 in European Patent Application No. EP 06254055.4.

* cited by examiner

Primary Examiner — Sophia Vlahos
(74) Attorney, Agent, or Firm — Lori Anne D. Swanson

(57) ABSTRACT

The present invention discloses a method and apparatus for wide dynamic range phase conversion. In one embodiment, inphase and quadrature signal components of a complex input signal are collapsed into a single quadrant to produce a first signal representation. A scaling operation is subsequently performed on the first signal representation to produce a second signal representation. Lastly, the second signal representation is converted into the phase domain.

10 Claims, 3 Drawing Sheets

METHOD AND APPARATUS FOR WIDE DYNAMIC RANGE REDUCTION

BACKGROUND OF THE INVENTION

1. Field of the Invention

Embodiments of the present invention generally relate to digital filtering communication systems. More specifically, the present invention relates to a method and apparatus for the efficient reduction of a wide dynamic range of a signal.

2. Description of the Related Art

In many communication systems that employ digital filtering (e.g., channel selectivity), a wide signal dynamic range is produced in order to realize the full processing gain of the filter, to produce a high level of adjacent channel/blocker performance, and to reduce quantization noise. In receivers where channel selectivity functions are performed in the digital domain, very wide dynamic range signals (e.g., 16-bit+) are typically utilized to achieve high levels of linearity and selectivity. However, these wide signal dynamic ranges may present challenges for processing the signal in the phase domain (e.g., for any type of m-ary phase demodulation). In order to reduce the complexity of m-ary phase shift keying (PSK) receivers, it is often desirable to perform the required signal processing in the phase domain. This requires the conversion of the wide dynamic range complex baseband signal into a phase domain signal. Generally, the key to achieving an efficient design (e.g., low cost and high performance) for a digital demodulator is to reduce the dynamic range of the signal before converting to the phase domain, while simultaneously retaining a requisite amount of amplitude data by utilizing the same hardware resources. In this manner, a fully linear receiver along with its associated complexity (e.g., large look-up tables, costly quadrature signal computations, etc.) can be avoided.

Thus, there is a need in the art for an efficient method and apparatus that efficiently reduces the dynamic range of a signal while producing accurate phase information.

SUMMARY OF THE INVENTION

In one embodiment, the present invention discloses a method and apparatus for wide dynamic range phase conversion. More specifically, the inphase and quadrature signal components of a complex input signal are collapsed into a single quadrant to produce a first signal representation. A scaling operation is subsequently performed on the first signal representation to produce a second signal representation. Lastly, the second signal representation is converted into the phase domain. By reducing the wide dynamic range of a complex signal in the disclosed two-stage reduction process, phase conversion for these types of signals are conducted in an efficient manner.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 1:
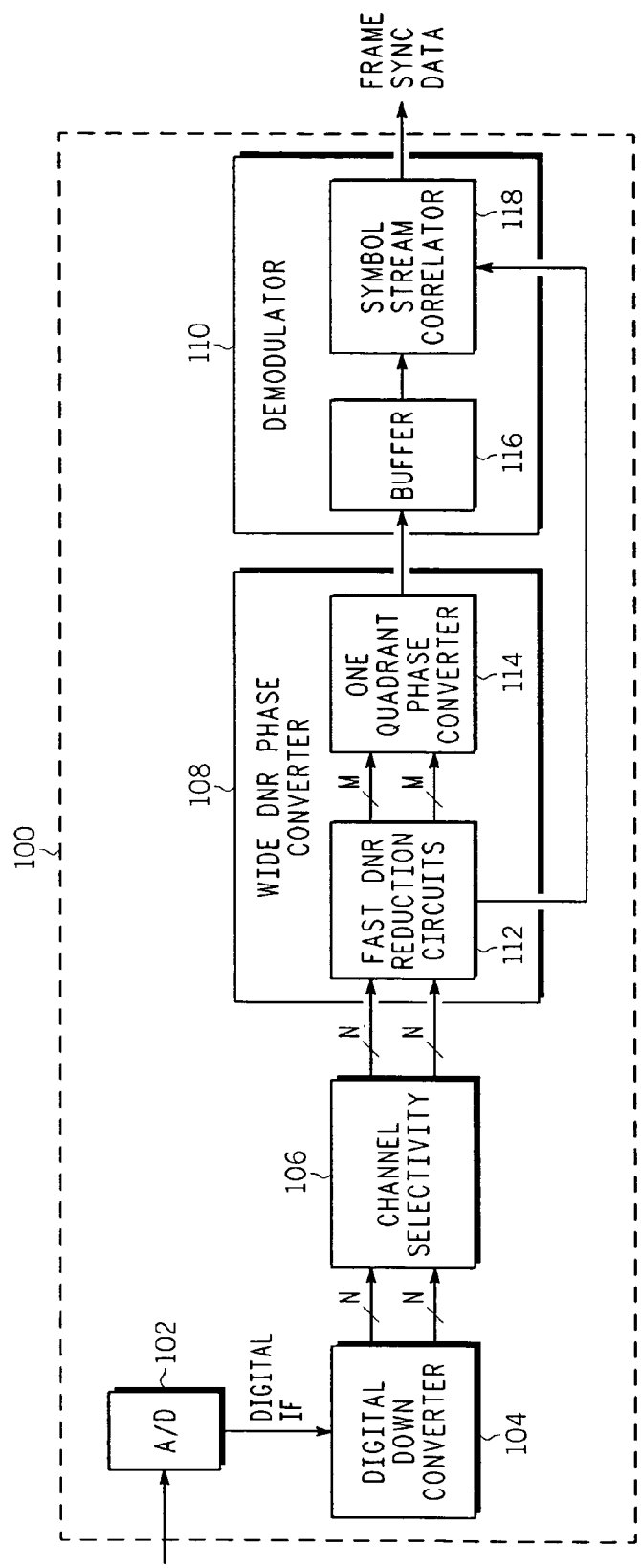
FIG. 1 depicts a block diagram of single carrier Quadrature Phase Shift Keying (QPSK) digital receiver in accordance with the present invention.

FIG. 1 illustrates a single carrier Quadrature Phase Shift Keying (QPSK) digital receiver 100, which is one embodiment that may utilize the present invention. The QPSK receiver may comprise an analog-to-digital (A/D) converter 102, a digital down converter 104, a channel selectivity module 106, a wide dynamic range (DNR) phase converter 108, and a demodulator 110. The A/D converter 102 may be any device or module that is commonly known in the art for converting analog signals into digital signals. The digital down converter 104 may be any module responsible for reducing the frequency of a received digital signal as well as producing separate N-bit sized in-phase (I) and quadrature (Q) signal components. Alternatively, a complex (I and Q) analog baseband signal may be directly sampled by a pair of A/D converters to produce digital I and Q signal components, as is well known in the art. The channel selectivity module 106 typically comprises at least one filter that receives the I and Q signal components of a baseband signal. Note that a digital channel selectivity function does not necessarily have to be performed in the digital receiver to have a large dynamic range on the I and Q signal components from the downconverter or A/D converters. For example, channel selectivity or downconversion functions may be performed in the analog domain before A/D conversion. In one embodiment however, the channel selectivity function is performed digitally to realize superior filter characteristics (e.g., large stopband rejection, low drift, etc.). The resulting signal components initially possess a wide dynamic range that consists of several bits (e.g., N=17 bits) in the digital domain. In one embodiment, the channel selectivity function in this system is performed digitally, thus resulting in wide dynamic range signals in the single carrier QPSK digital receiver. In one exemplary digital receiver, the complex baseband signal paths exceed 16-bits in width, which represents over 100 dB of potential signal dynamic range.

The digitally filtered I and Q signal components are then received by the wide dynamic range (DNR) phase converter 108. The wide DNR phase converter 108 comprises a fast DNR reduction circuitry module 112 and a one quadrant phase converter 114. The fast DNR reduction circuitry module 112 is responsible for performing two stages of dynamic range reduction as described below, i.e., reducing each component to M-bits in size (e.g., M=5 bits in one embodiment). Likewise, the one quadrant phase converter 114 is responsible for providing the correct quadrant and phase information for the dynamically reduced signal components. Lastly, the QPSK digital receiver 100 includes a demodulator 110 that comprises a buffer 116 and a symbol stream correlator 118. The buffer 116 receives the phase conversion signal from the DNR phase converter 108. Typical demodulator functions include symbol timing and carrier recovery, as are well known in the art. The symbol stream correlator 118 is the component of the demodulator 110 that is responsible for receiving squelch information from the converter 108 and produces a final digital data stream signal (e.g., frame synchronized data) from the demodulator 110.

In order to convert wide dynamic range I and Q signals into the phase domain for more efficient signal processing, the procedure would normally require a large and costly (in terms of die area) ROM look-up table (LUT) or a higher latency and more complex algorithm (such as a Cordic algorithm). Note that the implementation complexity of look-up table methods exponentially increase with each 6 dB increase in dynamic range requirements. If latency and silicon area are a concern, a highly efficient and fast critical path (e.g., <10 ns in current generation programmable gate arrays) circuit method has been developed that produces both highly reduced dynamic range quadrature signals and signal phase with limited amplitude information.

Figure 2:
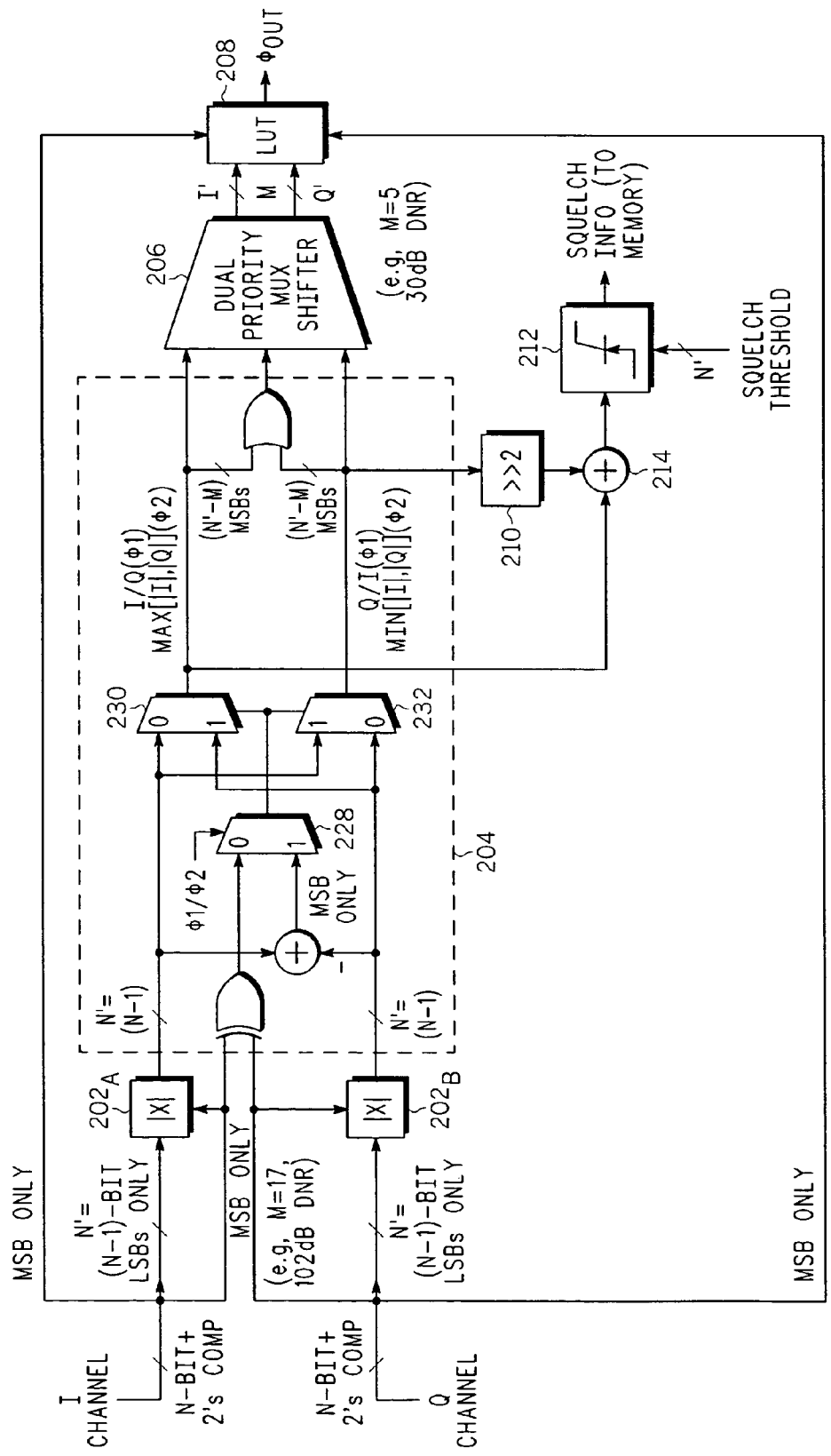
FIG. 2 depicts a block diagram of a wide dynamic range phase converter in accordance with the present invention.

FIG. 2 illustrates a block diagram of a wide dynamic range phase converter 200 in accordance with the present invention. In one embodiment, this device comprises the converter 108 depicted in FIG. 1. The converter 200 comprises a pair of absolute value operation modules $202_A$ and $202_B$, multiplexing circuitry 204, a dual priority multiplexer shifter 206, and a first quadrant lookup table (LUT) with a quadrant correction feature. The absolute value operation modules 202 respectively receive the I and Q components of the received signal (e.g., via two N-bit wide buses) from the channel selectivity module 106 and collapse these wide dynamic range complex baseband signals (e.g., I and Q components) into the first quadrant (typically after the necessary digital channel selectivity functions have been performed). Once this first dynamic range reduction is executed, the processed I and Q signal components are forwarded to the multiplexing circuitry module 204.

In one embodiment, the multiplexing circuitry 204 utilizes hardware resource sharing to perform a conditional I/Q swap function during one clock phase, and part of a magnitude estimation function for squelch information generation during the other clock phase. The multiplexing circuitry 204 in FIG. 2 specifically shows one exemplary configuration (i.e., depicted as a dashed box) that may be utilized (i.e., the circuitry 204 utilizes hardware resource sharing to perform a conditional I/Q swap function during one clock phase (termed φ1), and part of a magnitude estimation function for squelch information generation during the other clock phase (termed φ2)). The swapping of the absolute values of the I and Q channels are generally performed when the complex input signal lies in the $2^{nd}$ or $4^{th}$ quadrants. The magnitude estimate in one embodiment is performed by summing the maximum of the absolute values of the I and Q channels with one quarter of the minimum of the absolute values of the I and Q channels (as shown in FIG. 2). Those skilled in the art realize that there are many ways to estimate or compute the magnitude of a complex signal which could be applied in place of the shown embodiment without departing from the spirit of the invention. For example, the multiplexing circuitry 204 depicted in FIG. 2 may be used for either i) I and Q component swapping or ii) a magnitude estimation computation (in conjunction with components 210 and 214). The specific function of the circuitry 204 is directly determined by the control signal applied to multiplexor 228. Namely, the I/Q swap function is selected during the first clock phase (φ1) while the sign of the subtraction result is determined during the second clock phase (φ2), which is ultimately used to determine the maximum and minimum values for the magnitude estimation. Furthermore, during the first clock phase (or computation cycle), either an I or Q value is output of the multiplexor 230 and the remaining (Q or I) value is output from the bottom multiplexor 232. Likewise, during the second clock phase, the maximum value between I and Q (i.e., max[|I|, |Q|]) is output from multiplexor 230 and the minimum value (i.e., min[|I|, |Q|]) is output from multiplexor 232. This information is subsequently provided to the adder 214 and shifter 210 for the magnitude estimation computation.

Once the signals traverse the multiplexing circuitry 204, the I and Q components are inputted into a dual priority multiplexer shifter 206 along with the output of a parallel logical OR function of the (N'-M) MSBs of the two input buses. The dual shifter 206 is responsible for further reducing the signal dynamic range (DNR) to M bits by performing an instantaneous scaling operation on the (conditionally swapped) absolute values of the I and Q signals. Note that the scaling operation may be performed on a sample by sample basis on oversampled signals in order to achieve very fast response times.

More specifically, the instantaneous scaling operation is efficiently conducted in a specialized priority multiplexer encoder, which performs a maximum amount of shifting (or scaling of) the signals, typically based on the minimum number of leading zeros in the modified signals (as efficiently generated by a bitwise logical "OR" operation on the absolute values of the signal busses). Both quadrature signals are shifted by the same amount to preserve a vast majority of the phase information after quantization. For example, the shifter will compare the signal components and discard as many leading zeros that are common to both components in one embodiment. There is a variable amount of quantization that occurs on the signal, inversely proportional to the number of minimum number leading zeros in both signals. Note that other embodiments could perform this dynamic range reduction/scaling operation in other quadrants (e.g., $2^{nd}$, $3^{rd}$, $4^{th}$ quadrants) based on the number of leading phase-insignificant digits without departing from the spirit of the invention. This is effectively a soft (but very fast) limiting of the signal, or a form of instantaneous automatic gain control (AGC). This procedure is performed according to an instantaneous sampling methodology, i.e., on a sample by sample basis, in order to achieve the quickest AGC response time. Fast AGC response times may be important for certain applications where the communications channel changes rapidly. Those skilled in the art realize that any type of band limiting (or filtering) could also be applied to reduce the rate at which the samples are scaled with no loss of applicability to the present invention. Note that the sample by sample gain scaling will generally not have any effect on the phase domain processing in the demodulator, since phase information is largely preserved (other than quantization of the ratio of the limited I and Q channels). Note also that limited amplitude information may be preserved before the scaling process, as further described below.

The DNR reduction in the signals resulting from this scaling operation may be significant, depending on the respective number of leading zeros in the I and Q input signals. For example, the signal may be reduced from 17 bits to 5 bits, or correspondingly, from −100+dB to ~30 dB of DNR. In addition, the degree in which the amount of dynamic range reduction can be performed on the signals is also dependent on the modulation type. Higher level modulations (e.g., 8-PSK, 16-QAM, etc.) will generally require more dynamic range to accurately reproduce.

Since the signal dynamic range is greatly limited (without significantly affecting the ratio of the I and Q component signals), a much simpler phase conversion process can take place in the receiver. This may be accomplished in one embodiment by storing a single quadrant of an arctan function in a relatively small memory LUT. The quadrant information of the phase output can be pre-computed by examining the sign bits of the wide dynamic range component signals (e.g., the most significant bit of each signal component {I and Q} is extracted prior to the absolute value operation and subsequently provided to the LUT 208).

In addition to the dynamic range reduction produced by the present invention, a limited amount of amplitude information can also be retained for further processing. One advantage is that this limited amplitude information may be generated by sharing many of the same hardware resources, thus resulting in a very low implementation cost for the function (e.g., generally less than 200 gates). In one embodiment, a shifter 210 (e.g., a shifter for performing a "shift right by 2" operation) receives data from either the I or Q component, depending on which is has the lesser value. Similarly, data from the other component (i.e., the maximum value) is provided to an adder 214 for performing an adder function that effectively computes a magnitude estimate of the complex signal. For example, this "adder" may take the maximum value and add it to $\frac{1}{4}^{th}$ of the minimum value to obtain an estimate of the complex signal magnitude. This magnitude is then compared to a squelch threshold value via a comparator 212 to obtain hard-limited squelch information. The squelch threshold value is utilized as a means to distinguish noise (e.g., below the threshold) from the presence of a complex signal (e.g., a value above the threshold). The resulting squelch information may comprise of one bit of information (typically per sample) that will be provided to the demodulator to aid a symbol stream correlation operation. Those skilled in the art realize that filtering could be applied to the magnitude estimate or squelch information without any loss of applicability to the present invention.

More specifically, the single bit of amplitude information is retained to assist the synchronization of received data and greatly improve the falsing rate performance of a receiver. In a field-programmable gate array (FPGA) implementation, block memories inherently contain parity bit storage that can be utilized to store squelch information along with the phase data while incurring no additional overhead. The limited amplitude information mentioned above is useful for synchronization/correlation algorithms and can also be useful for information relating to forward error correction (FEC). In one embodiment, amplitude information is hard-limited to one bit of data pertaining to the complex signal as well as to the phase information associated with the signal sample. The complex signal modulus (or approximate magnitude) is compared with a predetermined threshold (e.g., squelch threshold 212) and used in symbol-stream correlations to incorporate limited amplitude data into the correlation to aid the synchronization process. For example, a (hardened) symbol stream correlator could require that a majority of the symbol samples presented to the correlator pass this squelch threshold (i.e., be classified as a valid signal sample) before the correlation result is considered valid. Thus, very noisy signals, which might normally appear as valid synchronization symbol streams in a phase-only demodulator, would be correctly classified as noise. Notably, this approach has the benefit of performing like a more costly linear correlator without the $N^2$ complexity associated with a typical N-symbol linear correlator. Other embodiments of the invention could provide additional levels of limited amplitude information by performing more comparisons (instead of the single comparison as shown in 212) that would be useful for other modulation types (e.g., M-ary QAM). The net effect is that receiver falsing and data misalignment rates are greatly reduced using the described invention.

Figure 3:
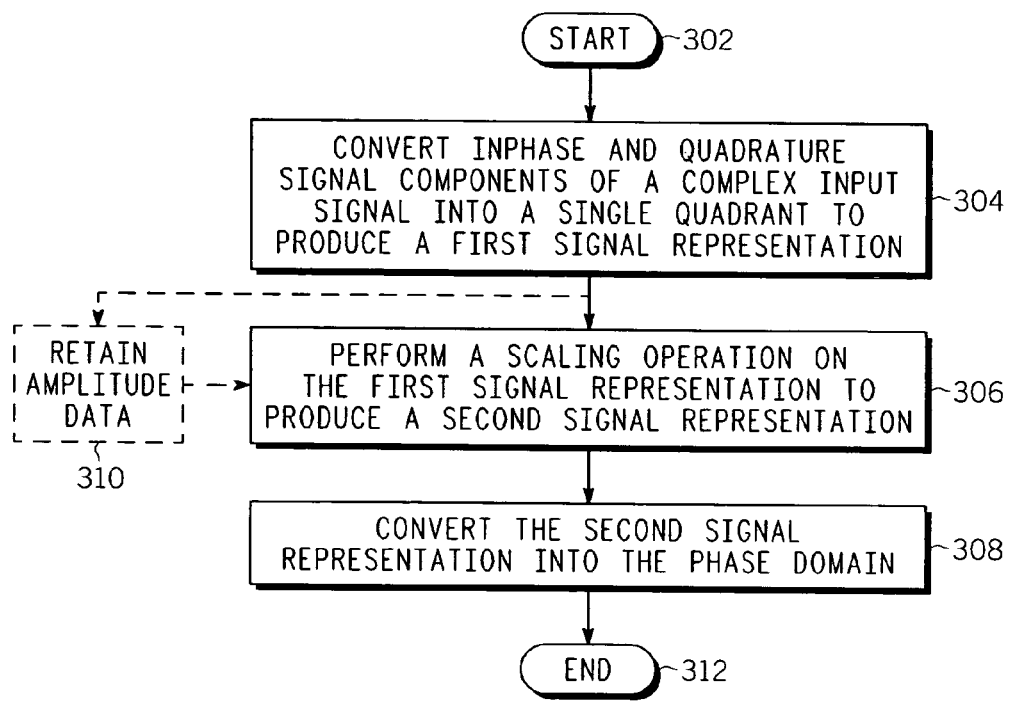
FIG. 3 depicts a method for wide dynamic range phase conversion.

FIG. 3 illustrates a method 300 for wide dynamic range phase conversion in accordance with the present invention. Method 300 begins at step 302 and proceeds to step 304 where the inphase and quadrature signal components of a complex input signal are collapsed into a single quadrant to produce a first signal representation. In one embodiment, this comprises two absolute value operation modules 202; each receives one of the inphase and the quadrature signal components, respectively. By applying these signal components to an absolute value operation, the resulting signal components are completely positive which consequently produces a first reduced dynamic range complex signal representation that is positioned in the first quadrant.

At step 306, a scaling operation is performed on the first signal representation to produce a second signal representation. In one embodiment, the scaling operation comprises the instantaneous scaling of a complex sample in the first reduced dynamic range complex signal representation by an amount derived from a minimum number of leading zeros present in the inphase and quadrature components (of the complex sample in the first signal representation). The second reduced dynamic range complex signal representation may be produced by a dual priority multiplexer shifter 206 that reduces signals to the least dynamic range possible (e.g., extract the greatest amount of leading zeros common to both signal components). In one embodiment, the shifter 206 performs this instantaneous sampling procedure on a sample by sample basis as described above.

At step 308, the second signal representation is converted into the phase domain. In one embodiment, a single quadrant phase (e.g., first quadrant of arctan function) lookup table (LUT) 208 is used to derive phase information. The present invention utilizes the most significant bit (i.e., the "sign" bit in a two's complement binary representation) from each of the initial I and Q signal components that are initially received by the wide DNR phase converter 200. By referencing these bits to the LUT 208 the appropriate phase information may be determined. In one embodiment, the method 300 continues to step 312 and ends.

In an alternative embodiment, the method 300 may also include step 310, wherein a necessary amount of amplitude data is retained. Notably, this amplitude data may be restricted to one bit of information. This one bit of information may be generated by comparing a magnitude estimation of the first reduced dynamic range complex signal with a threshold (e.g., a squelch threshold). More specifically, a "shift right by two" operator 210 and an adder 214 are utilized to generate a magnitude estimate of the complex signal sample. This magnitude estimation is subsequently compared to a squelch threshold by a comparator 212 to ascertain if the sample is actually a portion of a complex signal or noise. The resulting squelch information (e.g., amplitude data) is ultimately provided to a demodulator for a signal stream correlation operation. The method 300 then proceeds to step 312 and ends.

While the foregoing is directed to embodiments of the present invention, other and further embodiments of the invention may be devised without departing from the basic scope thereof, and the scope thereof is determined by the claims that follow.

The invention claimed is:

1. A method for wide dynamic range phase conversion in a digital communication device, the method comprising:
   converting an inphase signal component and a quadrature signal component of a complex input signal to a single quadrant to produce a first signal representation having a reduced dynamic range;

performing a scaling operation on said first signal representation by an amount derived from a common number of leading zeroes in said inphase signal component and said quadrature signal component of said complex input signal in said first signal representation to produce a second signal representation;

determining a complex signal magnitude from said first signal representation and obtaining squelch information based on a squelch threshold;

converting said second signal representation into a phase domain representation using a single quadrant phase lookup table to derive phase information, the lookup table using a most significant bit of the inphase signal component and a most significant bit of the quadrature signal component, wherein complex signal magnitude is determined by summing a maximum of the absolute values of the inphase signal component and the quadrature signal component with a fraction of a minimum of the absolute values of the inphase signal component and the quadrature signal component;

comparing said complex signal magnitude to the squelch threshold to generate the squelch information which comprises one bit of information; and retaining amplitude data in the one bit of information for a signal symbol stream correlation operation.

2. The method of claim 1, wherein each of said first signal representation and said second signal representation comprises a complex signal.

3. The method of claim 1, wherein said converting said inphase signal component and said quadrature signal component step comprises performing an absolute value operation on each of said inphase signal component and said quadrature signal component of said complex input signal.

4. The method of claim 1, wherein said second signal representation comprises said first signal representation having a further reduced dynamic range.

5. The method of claim 1, wherein the fraction of the minimum of the absolute values of the inphase signal component and the quadrature signal component is 0.25.

6. An apparatus for wide dynamic range phase conversion, the apparatus comprising:

a converter configured to convert an inphase signal component and a quadrature signal component of a complex input signal to a single quadrant to produce a first signal representation having a reduced dynamic range;

a mux encoder configured to perform a scaling operation on said first signal representation by an amount derived from a common number of leading zeroes in said inphase signal component and said quadrature signal component of said complex input signal in said first signal representation to produce a second signal representation;

an adder configured to determine a complex signal magnitude from said first signal representation by computing a magnitude estimate using said first signal representation;

a comparator configured to obtain squelch information based on a squelch threshold and said first signal representation by comparing the magnitude estimate to the squelch threshold to generate one bit of information, and retain amplitude data in the one bit of information for a signal symbol stream correlation operation; and said apparatus configured to convert said second signal representation into a phase domain representation using a single quadrant phase lookup table to derive phase information, the lookup table using a most significant bit of the inphase signal component and a most significant bit of the quadrature signal component, wherein complex signal magnitude is determined by summing a maximum of the absolute values of the inphase signal component and the quadrature signal component with a fraction of a minimum of the absolute values of the inphase signal component and the quadrature signal component.

7. The apparatus of claim 6, wherein each of said first signal representation and said second signal representation comprises a complex signal.

8. The apparatus of claim 6, wherein the converter converts said inphase signal component and said quadrature signal component by at least performing an absolute value operation on each of said inphase signal component and said quadrature signal component of said complex input signal.

9. The apparatus of claim 6, wherein said second signal representation comprises said first signal representation having a further reduced dynamic range.

10. The apparatus of claim 6, wherein the fraction of the minimum of the absolute values of the inphase signal component and the quadrature signal component is 0.25.

* * * * *